(12) United States Patent
Curry et al.

(10) Patent No.: US 8,444,117 B2
(45) Date of Patent: May 21, 2013

(54) QUICK RELEASE COUPLING FOR CONNECTING STABILIZER JACKS TO A VEHICLE

(75) Inventors: Patrick A. Curry, El Segundo, CA (US); Carmen R. Curry, El Segundo, CA (US)

(73) Assignee: Curry Enterprises, El Segundo, CA (US)

(*) Notice: Subject to any disclaimer, the term of this patent is extended or adjusted under 35 U.S.C. 154(b) by 113 days.

(21) Appl. No.: 12/702,588

(22) Filed: Feb. 9, 2010

(65) Prior Publication Data

US 2011/0193038 A1   Aug. 11, 2011

(51) Int. Cl.
*B60S 9/06* (2006.01)

(52) U.S. Cl.
USPC .................... 254/424; 254/418; 254/122

(58) Field of Classification Search
USPC ............... 254/424, 418, 122, 124, 126, 93 R
See application file for complete search history.

(56) References Cited

U.S. PATENT DOCUMENTS

| | | | |
|---|---|---|---|
| 3,580,543 A | 5/1971 | Hafeli | |
| 4,055,329 A * | 10/1977 | Hammond | 254/424 |
| 4,582,001 A * | 4/1986 | Leikarts | 108/106 |
| 4,787,600 A * | 11/1988 | Bode | 254/126 |
| 5,139,233 A * | 8/1992 | Goss | 254/134 |
| 5,205,586 A | 4/1993 | Tallman | |
| 5,348,330 A | 9/1994 | Few | |
| 5,379,987 A * | 1/1995 | Cleary | 254/134 |
| 5,711,504 A * | 1/1998 | Cusimano | 248/354.3 |
| 6,089,545 A * | 7/2000 | Norman et al. | 254/134 |
| 6,176,641 B1 * | 1/2001 | Schenk | 403/381 |
| 6,213,491 B1 * | 4/2001 | Southard, Jr. | 280/475 |
| 6,361,023 B1 | 3/2002 | Peavler | |
| 6,457,700 B1 * | 10/2002 | Hong | 254/8 B |
| 6,527,251 B1 * | 3/2003 | Garceau | 254/126 |
| 6,607,181 B2 * | 8/2003 | Garceau | 254/126 |
| 6,644,626 B2 * | 11/2003 | Baril | 254/2 R |
| 7,182,316 B2 * | 2/2007 | Sykes | 254/85 |

* cited by examiner

*Primary Examiner* — Lee D Wilson
(74) *Attorney, Agent, or Firm* — Law Offices of Joseph R. Cruse; Joseph R. Cruse, Jr.

(57) ABSTRACT

The invention relates to stabilizers for use with a vehicle. The quick release coupling system entails a pair of grooved plates that can easily attach and detach with respect to one another. The top plate of the coupling system is mechanically attached to the frame of the vehicle and a bottom plate is mechanically attached to a conventional stabilizer. These grooved plates create a quick release coupling joint that facilitates attachment and removal of the stabilizers from the vehicle.

3 Claims, 8 Drawing Sheets

QUICK RELEASE COUPLING FOR CONNECTING STABILIZER JACKS TO A VEHICLE

FIELD OF THE INVENTION

This invention relates generally to stabilizers that are commonly placed on the corners of recreational vehicles and trailers.

BACKGROUND OF THE INVENTION

Stabilizers are installed on the corners of vehicles such as trailers, travel trailer, recreational vehicles and toy haulers for the purpose of stabilizing these vehicles while they are stationary.

The stabilizers are permanently installed to the underside bottom corners of the vehicle. During operation of the vehicle the stabilizers, which extend well below the frame of vehicle, can hinder ground clearance, particularly when driving off road or on uneven surfaces. The loss of ground clearance often causes the stabilizers and the vehicles to be damaged when the vehicle is driven.

it is desirable to remove the stabilizer before operating the vehicle. However because current stabilizer attachment systems are securely bolted or welded directly to the frame of vehicle, such being that they are not easily removed.

BRIEF DESCRIPTION OF THE DRAWINGS

In order to more fully understand the manner in which the above-recited and other advantages and objects of the invention are obtained, a more particular description of the invention will be rendered by reference to specific embodiments thereof which are illustrated in the appended drawings. Understanding that these drawings depict only typical embodiments of the invention and are therefore not to be considered limiting of its scope, the invention in its presently understood best mode for making and using the same will be described with additional specificity and detail through the use of the accompanying drawings in which.

DETAILED DESCRIPTION OF THE DRAWINGS

Figure 1:
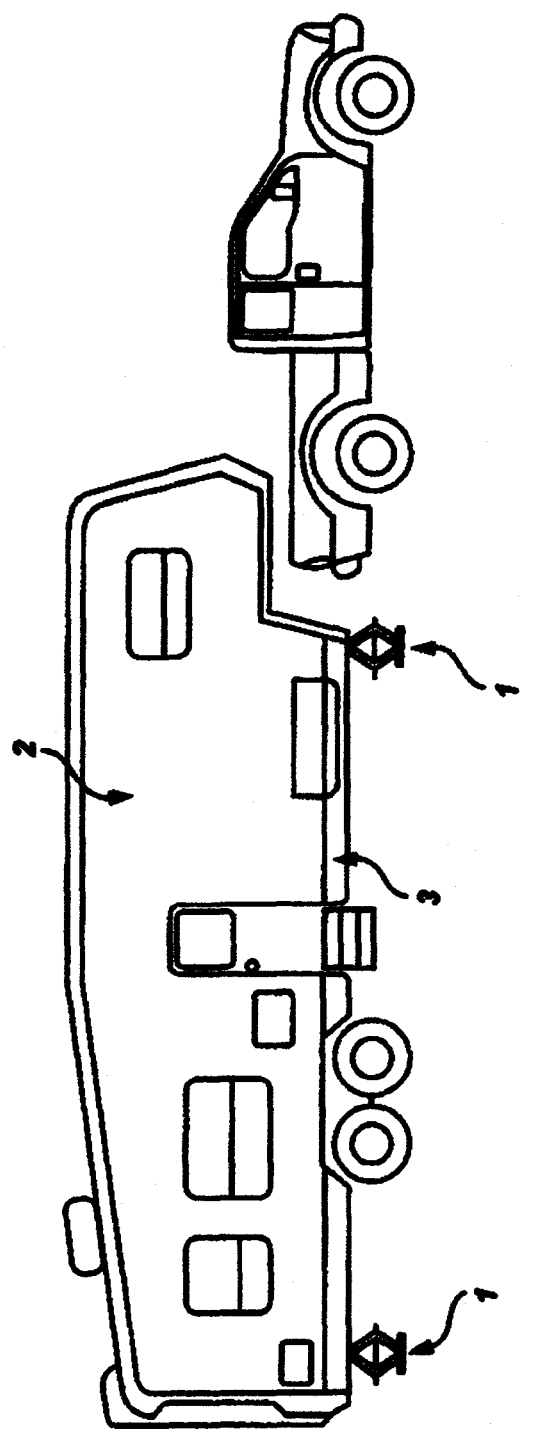
FIG. 1 shows stabilizer locations on vehicle.

FIG. 1 depicts how stabilizers (1) may be needed on a recreational vehicle trailer or hauler (2). These vehicles are used for recreational camping, moving cargo and for other services such as portable bathrooms, classrooms and the like.

These vehicles (2) have a stabilizer (1) attached at all four corners of the vehicle frame (3) to stabilize the vehicle (2) when the vehicle (2) is stationary and requires stabilization. The stabilizer (1) is attached to the vehicle (2) on the bottom of the vehicle frame (3). The stabilizer (1) is often welded or securely screwed to the frame with threaded fasteners.

The stabilizers (1) are lowered when the vehicle (2) is stationary and raised when it is driven. This current method of attaching the stabilizers (1) utilizes welding the stabilizers (1) to the frame (3) or with screws which are difficult to remove easily.

The present invention allows for the easy removal of the stabilizers (1) for storage when the vehicle (2) is being driven thus adding clearance to the ground and avoiding damage to the stabilizers (1) and vehicle (2). The ability to remove and store these stabilizers (1) while driving avoids costly damage and replacement of stabilizers (1).

The invention provides a quick release coupling system which requires no special tools and makes removal of stabilizers (1) straightforward and trouble free.

The present invention has been developed in response to the present state of the art, and in particular, in response to the problems and needs in the art not heretofore fully or completely solved by currently available stabilizers (1). Thus, the present invention provides a quick-release coupling for a stabilizer (1) that permits the stabilizer (1) to be easily released from the vehicle frame (3).

Figure 2:
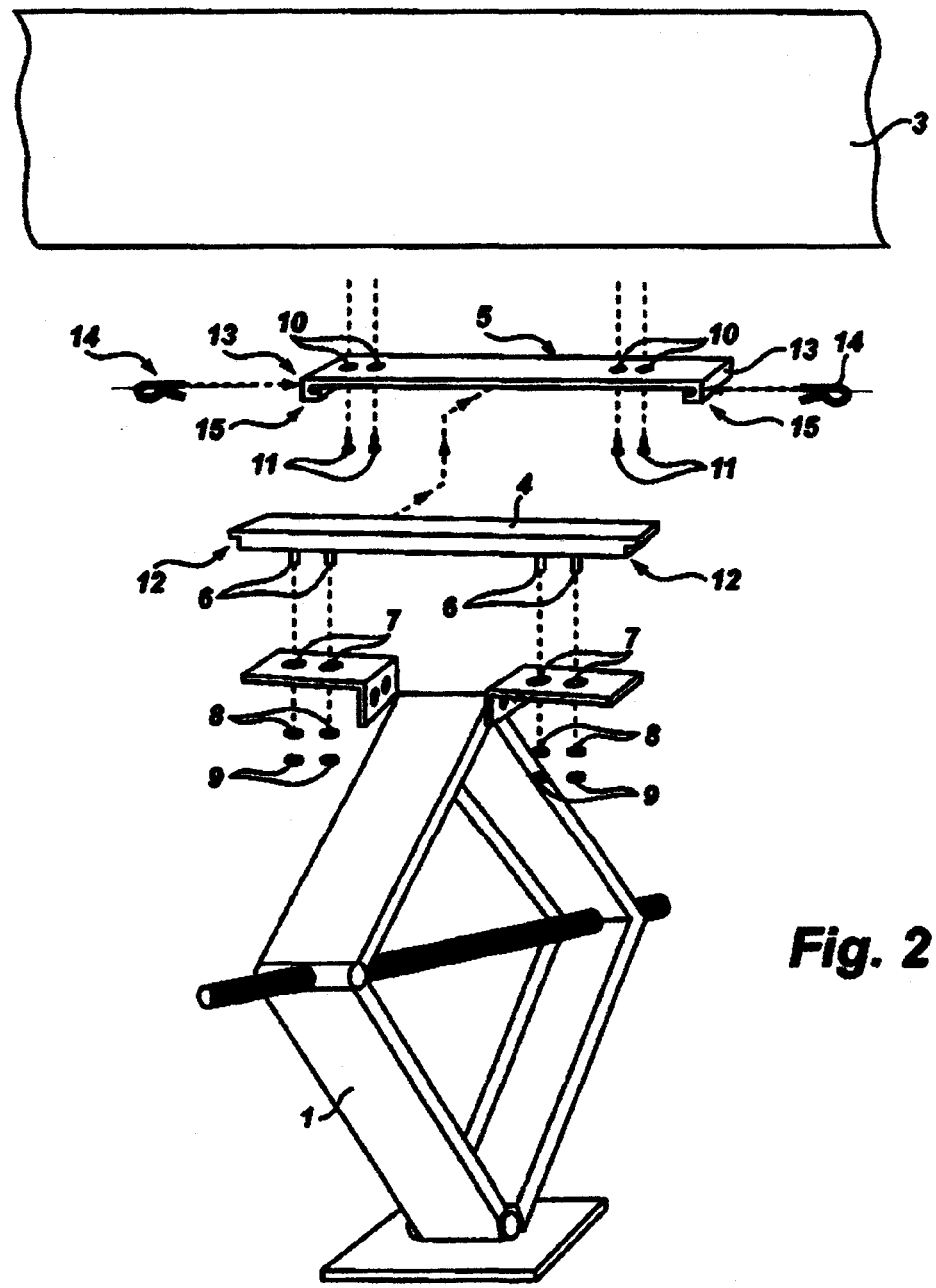
FIG. 2 shows an exploded view of the stabilizer with bottom and top plates and the mounting holes on the stabilizer.

Referring now to FIG. 2, the quick release coupling has a bottom plate (4) and a top plate (5). The bottom plate (4) has four threaded fasteners (6) that are spaced to fit through the stabilizer mounting holes (7) for easy mounting to the stabilizer (1). These studs (6) are secured using washers (8) and threaded nuts (9). The top plate (5) has holes (10) for mounting to frame (3) using top plate mounting screws (11) which pass through the top plate mounting holes (10).

The bottom plate of the quick release coupling (4) is grooved (12) in such a way to slide into the quick release top plate (5). The top plate (5) is grooved (13) to receive grooved end (12) of bottom plate (4). Accordingly, the bottom plate (4) while attached to stabilizer (1) slides easily into top plate (5) attached to the frame (3) of the vehicle (2) and is secured with retaining clips (14) inserted into the mounting holes (15).

After installing the quick release bottom plate (4) to the stabilizer (1) and installing the quick release top plate (5) to the vehicle frame (3), and sliding the bottom plate (4) into the top plate (5), the stabilizer (1) is ready for use.

The quick release stabilizer coupling provides a way to easily remove stabilizers (1) when a vehicle (2) is driven to add clearance to vehicle and avoid damage to stabilizer (1) by bottoming out vehicle (2) especially on uneven roadways and off road conditions. A typical stabilizer (1) will drop up to 5 inches below frame (3) of the vehicle. When stabilizer (1) is removed by means of the quick release coupling for storage it reduces this lost clearance greatly. The grooved connections ends (13) on top plate (5) and grooved connections ends (12) bottom plate (4) create an easy way to separate the stabilizer (1) from frame (3). When stabilizing is needed they are simply slid back together and stabilizer (1) is ready for use.

Figure 3:
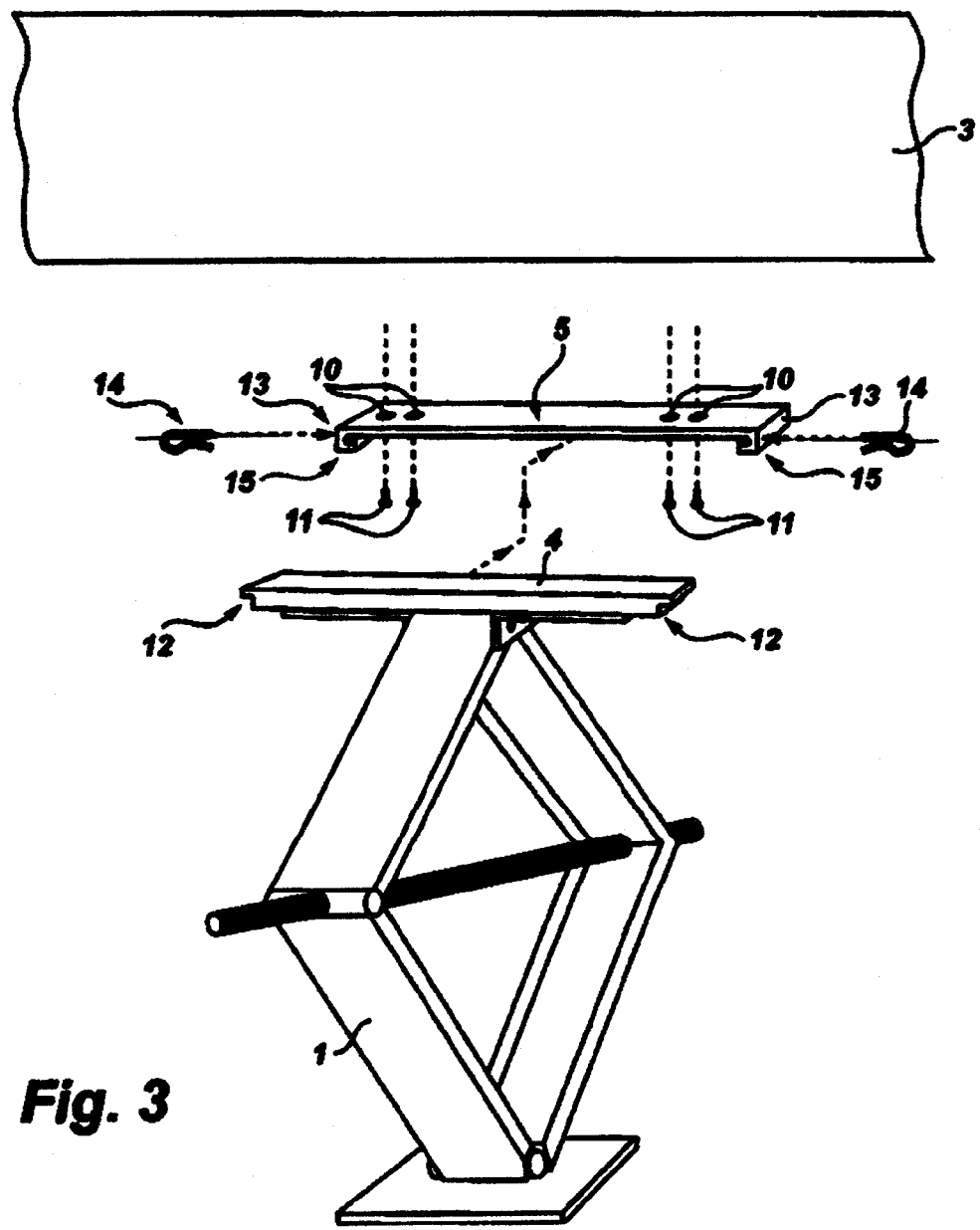
FIG. 3 shows the stabilizer with a bottom plate integrated into the design of the stabilizer itself.

In alternative embodiments as displayed in FIG. 3, a stabilizer (1) with the quick release stabilizer coupling is integrated into the design of the stabilizer (1). This option would eliminate the need to install bottom plate (4) to the stabilizer (1), as it would become a part of the stabilizer (1) itself. On an integrated stabilizer (1) one would only need to mount the top plate (5) to the frame (3) as the bottom plate (4) would be part of the stabilizer (1) itself. Welding the top plate (5) to the frame (3) is also an option for a more permanent installation.

Figure 4:
FIG. 4 shows a side view of the top plate seated on the bottom plate with threaded fasteners and retaining pins.

As shown in FIG. 4, the grooved ends (13) of top plate (5) and the grooved ends (12) of bottom plate (4) can be configured using a simple angle iron, dovetail or other means of achieving the goal of a simple device that allows removal of the stabilizer (1) from the frame (3). The retaining pin or clip (14) could be installed in other parts of the quick release system to achieve the same goal of locking the two parts together. The retaining pin (14) could also be replaced by a threaded fastening system to achieve the same goal.

To use this embodiment on an existing stabilizer (1) a person would remove the screws (11) attaching it to the frame (3). The screws (11) would be used to attach the top plate (5). The bottom plate (4) would be attached to the stabilizer (1) using threaded connections (6). Then they would simply slide the stabilizer (1) with plate (4) into plate (5) and attach retaining pins (14).

Figure 5:
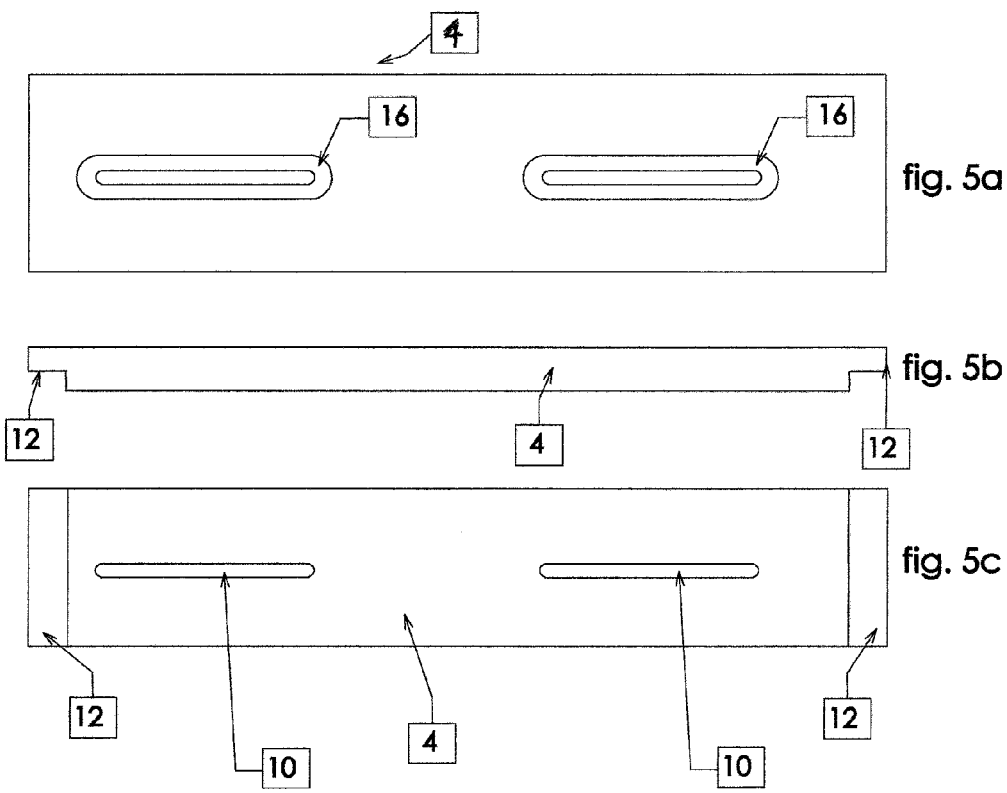
FIG. 5 shows detailed top, side and bottom views of the bottom plate.

FIG. 5, displays a detailed display of an embodiment of the bottom plate (4) which could be used independently and with standard screws or fasteners. To accomplish this goal of permitting an individual to use their own standard screws or fasteners, a bottom plate step (16) could be used to recess the standard screws or fastener. Additionally, the bottom plate elongated hole (17) would be lengthened to allow more universal fitting.

Figure 6:
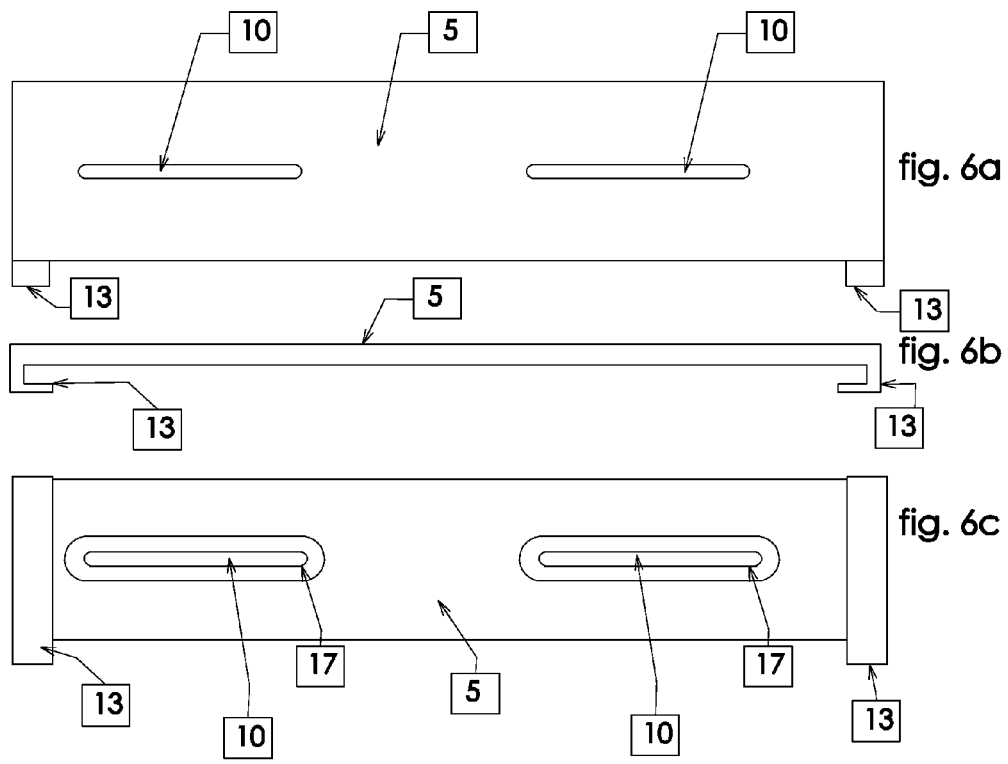
FIG. 6 shows detailed top, side and bottom views of the top plate.

FIG. 6, displays a detailed display of an embodiment of the top plate (5) which could be used independently and with standard screws or fasteners and in conjunction with the bottom plate of FIG. 5. Once again, to accomplish this goal of permitting an individual to use their own standard screws or fasteners, a top plate step (18) could be used to recess the standard screws or fastener, and the top plate elongated hole (19) would be widened to allow more universal fitting.

Figure 7:
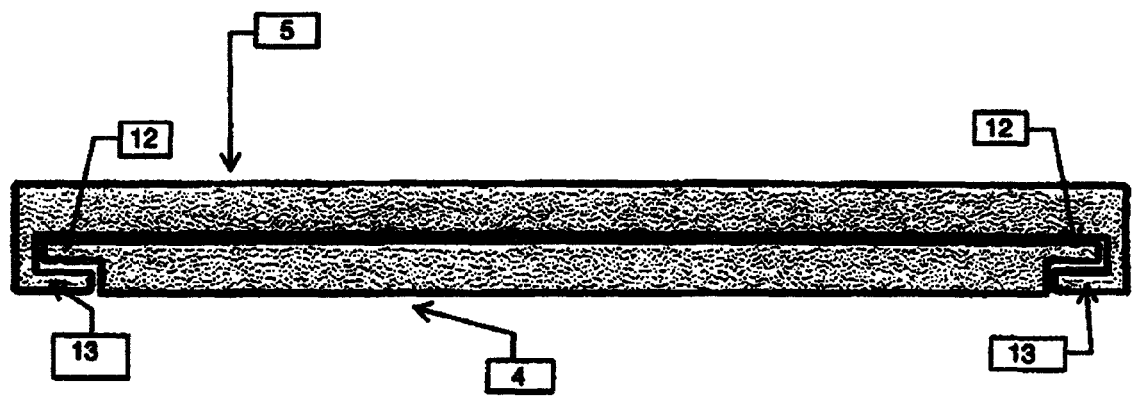
FIG. 7 shows a side view of the top plate seated on the bottom plate utilizing an open channel grooved slot.

FIG. 7, displays side view of this embodiment of the to plate (5) fitting within the bottom plate (4), with an open channel groove.

Figure 8:
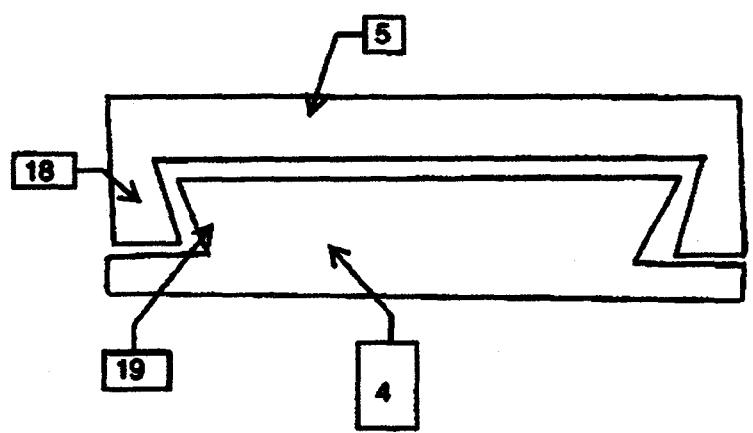
FIG. 8 shows a side view of the top plate seated on the bottom plate utilizing dovetail groove.

FIG. 8, displays side view of this embodiment of the top plate (5) fitting within the bottom plate (4), with a dove tail groove.

What is claimed is:

1. A stabilizer for a vehicle that can be conveniently installed or removed from the underside of the frame of a vehicle by means of an incorporated quick release coupling device, said stabilizer comprising:
   a single coupling,
   said coupling comprising an upper and lower bracket,
   said brackets designed in a thin plate shape,
   the upper and lower brackets containing a dovetail groove,
   said upper bracket possessing an upper and lower surface,
   said upper surface of the upper bracket adapted to be secured horizontally to the underside frame of a vehicle by means of a screw, bolt or similar fastner means,
   said lower bracket possessing an upper and lower surface,
   said lower surface of the lower bracket adapted to be secured horizontally to a stabilizer by means of a screw, bolt or other similar fastner means,
   said lower surface of the upper bracket and upper surface of the lower bracket adapted to be connected together in a coplanar relationship,
   said upper bracket grooved downwardly to create an open channel shaped slot,
   said lower bracket adapted to conform closely to the shape of said upper bracket's downward groove to provide a close fit thereinbetween.

2. The stabilizer defined by claim 1 wherein said bottom plate is secured horizontally to a vehicle stabilizer by means of a weld or similar permanent attachment means.

3. The stabilizer defined by claim 1 wherein said upper plate is secured horizontally to the underside of the frame of a vehicle by means of a weld or similar permanent attachment means.

* * * * *